(12) United States Patent
Gopal

(10) Patent No.: US 10,996,936 B2
(45) Date of Patent: May 4, 2021

(54) TECHNIQUES FOR DISTRIBUTING CODE TO COMPONENTS OF A COMPUTING SYSTEM

(71) Applicant: INTEL CORPORATION, Santa Clara, CA (US)

(72) Inventor: Vinodh Gopal, Westborough, MA (US)

(73) Assignee: INTEL CORPORATION, Santa Clara, CA (US)

(*) Notice: Subject to any disclaimer, the term of this patent is extended or adjusted under 35 U.S.C. 154(b) by 783 days.

(21) Appl. No.: 15/634,464

(22) Filed: Jun. 27, 2017

(65) Prior Publication Data

US 2018/0373516 A1 Dec. 27, 2018

(51) Int. Cl.
| | | |
|---|---|---|
| *G06F 9/44* | (2018.01) |
| *G06F 9/30* | (2018.01) |
| *G06F 9/46* | (2006.01) |
| *G06F 16/901* | (2019.01) |
| *G06F 9/455* | (2018.01) |
| *H04L 29/08* | (2006.01) |
| *G06F 8/51* | (2018.01) |
| *G06F 8/41* | (2018.01) |
| *H04L 29/06* | (2006.01) |

(52) U.S. Cl.
CPC .............. *G06F 8/51* (2013.01); *G06F 8/443* (2013.01); *G06F 9/4552* (2013.01); *H04L 63/08* (2013.01)

(58) Field of Classification Search
CPC ...... G06F 11/3604; G06F 40/40; G06F 40/58; G06F 40/263; G06F 9/454; G06F 9/44589; G06F 16/258; G06F 8/433; G06F 8/20; G06F 8/52; G06F 8/51; G06F 9/45504; G06F 9/45516; G06F 11/3624; H04L 67/34; H04L 67/025; H04L 67/42; H04L 67/02; H04L 67/28; H04L 67/2814; H04L 67/06; H04L 67/2823
See application file for complete search history.

(56) References Cited

U.S. PATENT DOCUMENTS

| | | | |
|---|---|---|---|
| 7,240,338 B1* | 7/2007 | Bell ........................ | G06F 8/51 717/137 |
| 9,411,581 B2* | 8/2016 | Peled ...................... | G06F 8/76 |
| 10,140,105 B2* | 11/2018 | Kellicker ................. | G06F 8/51 |
| 10,609,171 B2* | 3/2020 | Dhere ................. | H04L 67/2804 |

(Continued)

OTHER PUBLICATIONS

El-Kassass et al., Enhanced Code Conversion Approach for the Integrated Cross-Platform Mobile Development (ICPMD), 18 pages (Year: 2016).*

*Primary Examiner* — Thuy Dao
(74) *Attorney, Agent, or Firm* — Kacvinsky Daisak Bluni PLLC

(57) ABSTRACT

Techniques and apparatus for distributing code via a translation process are described. In one embodiment, for example, an apparatus may include at least one memory and logic, at least a portion of the logic comprised in hardware coupled to the at least one memory, the logic to determine a source code element to be translated to a target code element, determine source code information for the source code element, provide a translation request corresponding to the source code to a translation service, receive the target code element from the translation service, and execute the target code element in place of the source code element. Other embodiments are described and claimed.

24 Claims, 7 Drawing Sheets

(56) References Cited

U.S. PATENT DOCUMENTS

| | | | |
|---|---|---|---|
| 2005/0010912 A1* | 1/2005 | Adolphson | G06F 8/4434 717/151 |
| 2006/0072458 A1* | 4/2006 | Dougall | H04L 12/1868 370/230 |
| 2007/0294074 A1* | 12/2007 | Ciolfi | G06F 8/10 703/21 |
| 2008/0056161 A1* | 3/2008 | Okita | H04L 41/00 370/254 |
| 2009/0113402 A1* | 4/2009 | Chen | G06F 8/41 717/140 |
| 2011/0093837 A1* | 4/2011 | Guenthner | G06F 8/45 717/149 |
| 2012/0023483 A1* | 1/2012 | Welchman | G06F 11/3676 717/125 |
| 2017/0168791 A1* | 6/2017 | Nay | G06F 8/443 |
| 2017/0192757 A1* | 7/2017 | Frazier | G06F 30/34 |
| 2019/0012700 A1* | 1/2019 | Nelakonda | H04L 69/22 |

\* cited by examiner

TECHNIQUES FOR DISTRIBUTING CODE TO COMPONENTS OF A COMPUTING SYSTEM

TECHNICAL FIELD

Embodiments described herein generally relate to information processing and, more specifically, but not exclusively, to techniques for distributing code to components of a computing system.

BACKGROUND

Binary translation provides for the emulation of one instruction set by another through translation of binary code. In binary translation, sequences of instructions may be translated from a source instruction set to a target instruction set. The translation may be implemented in hardware (for example, by circuits of a processor), software (for example, run-time engines, static recompilers, emulators, firmware, and/or the like), or a combination of hardware and software. In conventional systems, target code alternatives for developers implementing binary translation generally include highly-tuned code that lacks flexibility and has limited modification potential, and open source, cross-platform code that may be more flexible, but is not able to deliver the desired performance. Furthermore, code providers want secure processes that do not reveal proprietary details of the underlying architectures of their technologies. As a result, developers do have access to code to achieve the best performance from each processor core.

DETAILED DESCRIPTION

Figure 1:
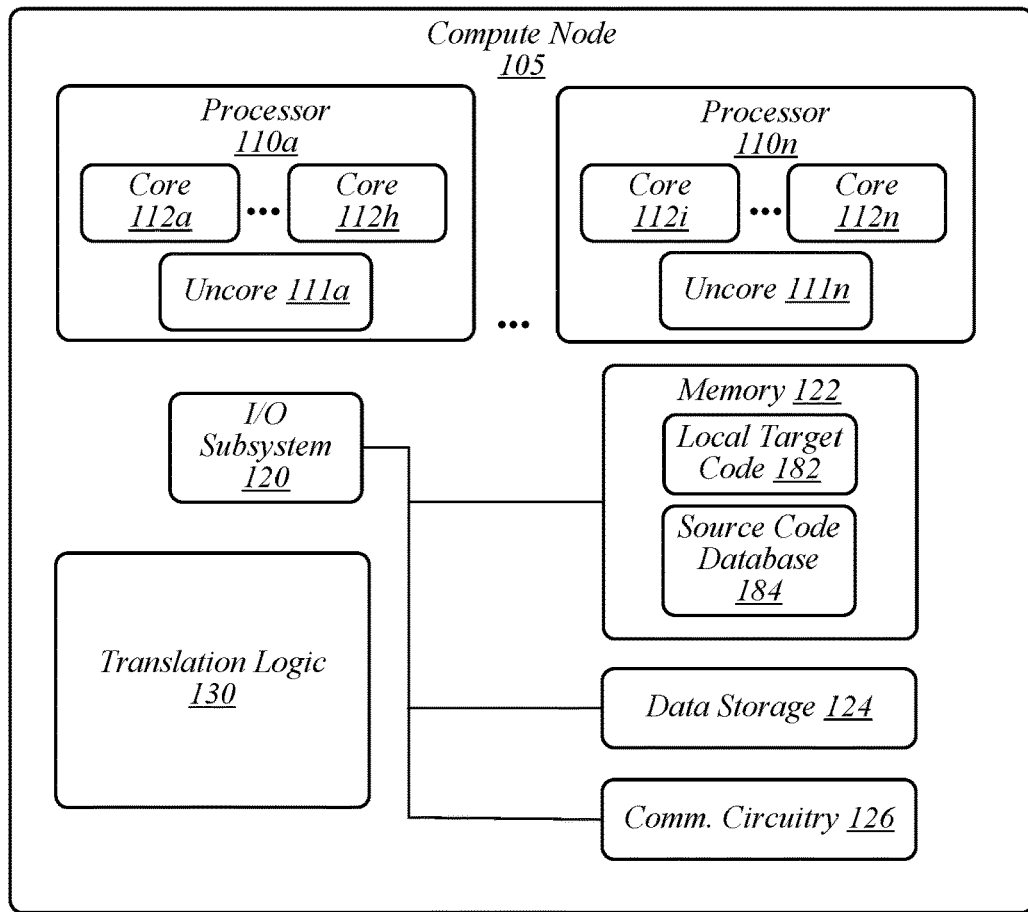
FIG. 1 illustrates an embodiment of a first operating environment.
Figure 1:
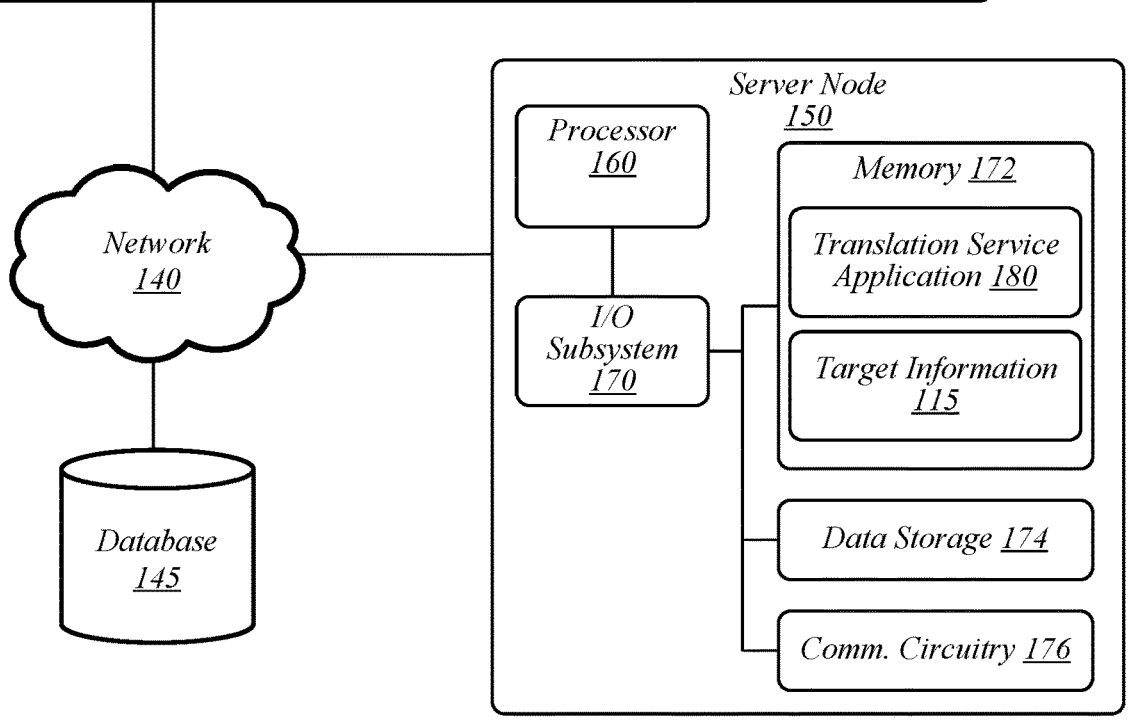

Various embodiments may be generally directed to techniques for distributing code to one or more components of a computing system. For example, some embodiments may include translation processes for translating code in a first form to a second form. In some embodiments, a component may assess code elements of code being executed within the computing system to determine whether the code element is to be translated to another code element. A code element to be translated may generally be referred to as "source code" or a "source code element." The code element to be exchanged with (for instance, to be executed in place of) the source code following completion of the translation process may generally be referred to as "target code," "a target code element," or "translation code."

In some embodiments, the component may have access to source code information (for instance, in a source code database) that includes translation indicators configured to indicate whether a code element is to be translated. In various embodiments, the source code information may include the code element (or portions of the code element), specified target code associated with the source code, operating characteristics of the target code, component information, security (or authentication) information, and/or the like. In various embodiments, the component may perform a lookup operation in the source code database prior to executing the code element to determine whether the code element is associated with a translation indicator. If the code element is associated with a translation indicator, the component may initiate the translation process and transmit source code information (which may include the actual code of the code element) associated with the code element to a translation service. In some embodiments, the translation process may be initiated if the component determines that the code element has not been executed previously, for instance, without performing a lookup in the source code database. In some embodiments, the translation service may determine a matching (or a closest matching) target code element based on the source code information and transmit the target code element to the component for execution in place of the source code.

Improved workload execution, such as workload acceleration, is becoming critical for processor developers to increase system performance. For example, some compute intensive workloads are challenging to execute and maintain expected performance targets, particularly over successive generations of processor components, such as processor cores, without requiring highly-tuned code for each particular component. In general, such highly-tuned code may be a combination of microarchitecture-specific optimization, new instruction set architecture (ISA) usages, as well as advanced algorithmic techniques that may be relevant for certain types of microarchitectures, but not others. For compute-intensive workloads, such as cryptographic operations and compression/decompression operations, such workloads may be large and complex and, therefore, impractical for hardware in the processor to best extract performance autonomously.

Conventional methods to improve performance have included developing highly-tuned functions for each processor core and to make such functions publicly available. However, the amount of code and the number of functions that require specialized code is increasing at a rate that is not sustainable under this model and, in addition, maintenance of such code is not feasible for developers. Open source projects such as OpenSSL, Zlib, and/or the like have been mechanisms used by developers to manage and facilitate code libraries. However, such platforms are reluctant at accepting the vast amount of code variations and the associated modifications that would be required to maintain such a system. In general, open source platforms operate by providing access to a minimal amount of code/functions in a higher form of abstraction (for instance, above assembly-level code) such that the code/functions are cross-platform, operating with sufficient efficiency across a set of processor architectures (for instance, Intel® architecture, ARM, Power, and/or the like). Alternatively, publishing multiple low-level code variations will reveal proprietary, non-public details of a microarchitecture. Accordingly, competitors may simply port the code to another microarchitecture for parallel components.

Accordingly, distributing closed-form solutions without code or without core code ultimately leads to slow adoption within the platform community and unmanaged or uncontrolled distribution of proprietary code may lead to unwanted circulation of proprietary technology. Accordingly, some embodiments provide systems and processes for extracting the best performance from a computing system component, such as a processor, while releasing code in a manner acceptable to the main deployment software frameworks, without revealing proprietary details (for instance, without proper security controls). Thus, various embodiments provide systems and processes for providing code paths for critical functions controlled by processor hardware from a central code database, for example, resident in a network or cloud.

For example, the component may include a central processing unit (CPU) having a binary translation component operative to implement the translation process according to some embodiments. The code element may include a function critical to execution of CPU. The translation service may include a plurality of different versions of the function, such as a general version and multiple versions optimized for certain microarchitectures. For example, the general version may be implemented in a high-level programming language (for instance, C/C++), with good performance over a wide range of different CPU types (for instance, various microarchitecture and architecture types). The general version may be in the broad category of functions developed using efficient data structures, algorithms, and other programming constructs, but without in-depth knowledge of or highly-tuned code for a specific CPU (for instance, cross-platform code). The optimized versions may be implemented to achieve the highest (or relatively high) performance out of each particular microarchitecture and, in some examples, may be assembly coded. The general version may include a publicly available version, such as through an open source platform, while the optimized versions may only be available in a proprietary database accessible only by authorized entities (for instance, a particular architecture making a specific request). In some embodiments, when the binary translation component executes a function call, the binary translation component may determine whether the function call is to be translated (for instance, based on a lookup in the source code database or due to the function call being invoked for the first time) and may send source code information associated with the function call to the translation service. If the translation service determines a match in a target code database, the translation service may transmit a best match (for instance, a best microarchitecture version) target code for the function. The CPU may then execute the target code. In some embodiments, the binary translation component may only perform a check of a code element at first invocation of the code element and/or responsive to certain triggering events, such as an event requiring a new version of the function to be obtained (for instance, core migration, such as in a heterogenous environment).

FIG. 1 illustrates an example of an operating environment 100 that may be representative of some embodiments. As shown in FIG. 1, operating environment 100 may include a compute node 105 and a server node 150 operably coupled via a network 140. In some embodiments, network 140 may include various types of networks and/or computing environments, including the internet, a distributed computing environment, a cloud computing environment (a "cloud"), and/or the like. Embodiments are not limited in this regard.

In various embodiments, each compute node 105 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, a consumer electronic device, combinations thereof, and/or the like. Each compute node 105 may include a plurality of processors 110a-n, an input/output (I/O) subsystem 120, a memory 122, a data storage device 124, communication circuitry 126, and/or the like. Communication circuitry 126 may include one or more transceivers, radios, or other components operative to facilitate communication over network 140, for example, between compute node 105 and server node 150. Compute node 105 may include other or additional components, such as those commonly found in a server device (for instance, transceivers, I/O devices, peripheral cards, and/or the like). Additionally, in some embodiments, one or more of the components of compute node 105 may be incorporated in, or otherwise form a portion of, another component. For example, memory 122, or portions thereof, may be incorporated in one or more of processors 110a-n.

Each processor 110a-n may be embodied as any type of processor capable of performing functions according to some embodiments. In some embodiments, processors 110a-n may include a multi-core processor, however, in various other embodiments, each processor 110a-n may be embodied as a single or multi-core processor(s), digital signal processor, microcontroller, architecture, microarchitecture, or other processor or processing/controlling circuit. Each processor 110a-n may include a plurality of cores 112a-n, such as two cores 112a-n, four cores 112a-n, and/or the like, and an uncore 114a-n. In some embodiments, compute node 105 may be configured to implement one or more virtual machines such that a portion of processors 110a-n and/or cores 112a-n may be virtual processors and/or cores. In various embodiments, at least a portion of processors 110a-n may include a CPU, graphics processing unit (GPU), system-on-a-chip (SoC), and/or the like.

Processors 110a-n may include an uncore 114a-n. In various embodiments, each uncore 114a-n may generally include any part of a particular processor 110a-n not included in the processor cores 112a-n (for instance, all or substantially all components of processor 110a-n except for the processor cores 112a-n themselves). For example, uncores 414a-n of processors 110a-n may include typical components of a processor or a system-on-a-chip (SoC). For example, each uncore 114a-n may include a memory controller, processor graphics, I/O controllers, power management circuitry, or other components of processors 110a-n, processor monitors, cache memory, and/or the like.

In various embodiments, memory 122 may be embodied as any type of volatile or non-volatile memory or data storage capable of performing functions according to some embodiment. In operation, memory 122 may store various data and software used during operation of compute nodes 105, such as OSs, applications, programs, code, code elements, libraries, drivers, agents, and/or the like. Memory 122 may be communicatively coupled to processors 110a-n via I/O subsystem 140, which may be embodied as circuitry and/or other components operative to facilitate I/O operations with processors 110a-n, memory 122, and/or other components of compute nodes 105. For example, I/O subsystem 140 may be embodied as, or otherwise include, memory controller hubs, I/O control hubs, firmware devices, communication links (for instance, point-to-point links, bus links, wires, cables, light guides, printed circuit board traces, and/or the like), and/or other components and subsystems to facilitate input/output operations. In some embodiments, I/O subsystem 140 may form a portion of a SoC and may be incorporated, along with processors 110a-n, memory 122, and other components of the compute node 210, on a single integrated circuit chip.

Data storage device 124 may be embodied as any type of device or devices configured for short-term or long-term storage of data such as, for example, memory devices and circuits, memory cards, hard disk drives, solid-state drives, and/or other data storage devices. Communication circuitry 126 may be embodied as any communication circuit, device, or collection thereof, capable of enabling communications between compute nodes 105, server node 150, code database 145, and/or other remote devices over network 140. Communication circuitry 126 may be configured to use various communication technologies (for instance, wired or wireless communications) and associated protocols (for instance, Ethernet, Bluetooth®, Wi-Fi®, WiMAX, and/or the like) to affect such communication.

In some embodiments, compute nodes 105, server node 150, and/or code database 145 may be configured to transmit and receive data with each other and/or other devices operating environment over network 140. Network 140 may be embodied as any number of various wired and/or wireless networks. For example, network 140 may be embodied as, or otherwise include, a wired or wireless local area network (LAN), a wired or wireless wide area network (WAN), a cellular network, InifiniB and (TB), Intel® Omni-Path Architecture (OAP) network, and/or a publicly-accessible, global network such as the Internet. As such, network 140 may include any number of additional devices, such as additional computers, routers, and switches, to facilitate communications among the elements of operating environment 100.

As shown in FIG. 1, compute node 105 may store a source code database 184, for example, in memory 122. Source code database 184 may include source code information associated with code elements of code (for instance, applications, software, firmware, programs, and/or the like) that may be executed via processors 110*a-n*. A code element may generally include a component of code including, without limitation, a function and/or an instruction of code. In some embodiments, source code database 184 may include a record for each of various code elements which may or may not have been previously executed by processors 110*a-n*. In various embodiments, source code information may include a translation indicator configured to indicate a translate status for a code element. For example, the translation indicator may include a binary value (for instance, 1=translate, 0=do not translate; 1=new (translate), 0=previously-executed (do not translate)) or some other value indicating the translate status. In some embodiments, new elements (for instance, a code element that has not been encountered by processors 110*a-n*, translation logic 130, and/or the like) may have a translate status of translate. In some embodiments, previously-executed elements may have a translate status of do not translate, which may be changed to translate responsive to a change event, such as a new version, core migration, and/or the like.

In some embodiments, source code information may include various information elements to identify the source code and/or to specify the type of target code. Non-limiting examples of source code information may include requesting compute node 105 information (for instance, operating hardware and/or software versions, microarchitecture information, and/or the like), a name or other identifier of the code element, version information, critical identifier or value (for instance, identifying the code as being a critical function or providing a value indicator (1=non-critical, 5=critical on a scale of 1-5)), the actual code of the source code element (for instance, assembly, compiled, or machine language code or portions thereof), and/or an identifier (for instance, a name and/or version) of a target code element to replace the source code element.

In some embodiments, multiple target code elements may be available for a source code element. For example, each target code element may be optimized for a certain optimization characteristic, such as power efficiency, performance, performance/power unit (for instance, performance/Watt), and/or the like. In some embodiments, source code information may include one or more optimization characteristics preferred for the target code element that will replace the source code. For example, a first source code element may be associated with a power efficiency optimization characteristic such that the selected target code element may be a version optimized for power efficiency (as opposed to another version that is not optimized or that is optimized for another optimization characteristic). In this manner, translation services according to some embodiments may not only provide for translation of source code, but may facilitate translation to the most efficient and/or up-to-date code.

In some embodiments, memory 122 and/or data storage 124 may include local target code 182. In various embodiments, local target code 182 may include target code that binary translation service 130 may access and use on compute node 105 without using translation processes according to some embodiments, for example, without server node 150. For example, if translation logic 130 cannot establish a connection with server node 150, server node 150 does not have corresponding target code, translation logic 130 decides not to obtain target code from server node 150, and/or the like, translation logic 130 may obtain target code from local target code 182. For instance, in some embodiments, translation logic 130 may only operate to obtain target code via translation processes using server node 150 if the source code has certain characteristics, such as being critical, having a threshold critical value, having an indicator directing translation logic 130 to obtain target code from server node 150, and/or the like.

In various embodiments, source code information may include security or authentication information to allow translation logic 130 to establish a connection with an application, server node 150 computing device, network, or other entity to facilitate the translation process. Non-limiting examples of security information may include passwords, credentials, certificates, encryption keys or codes, hardware information (for instance, server node 150 may only provide translation services for certain proprietary hardware versions), and/or the like.

Server node 150 may be embodied as any type of server computing device, or collection of devices, capable of performing functions according to various embodiments. In some embodiments, server node 150 may be embodied as a single server computing device or a collection of servers and associated devices. In another example, in some embodiments, server node 150 may be embodied as a virtual server formed from multiple computing devices distributed across network 140 and operating in a public or private network or cloud. Accordingly, although server node 150 is illustrated in FIG. 1 as being embodied as a single server computing device, it should be appreciated that server node 150 may be embodied as multiple devices cooperating together to facilitate functionality according to some embodiments. Server node 150 may include a processor 160, an I/O subsystem 170, a memory 172, a data storage device 176, communication circuitry 176, and/or other components and devices commonly found in a server or similar computing device. Those individual components of server node 150 may be similar to the corresponding components of compute node 105, the descriptions of which are applicable to the corresponding components of server node 150 and are not repeated herein so as not to obscure the present disclosure.

Memory 172 of server node 150 may store a translation service application 180 for execution by processor 460. Translation service application 180 may be operative to implement a translation service to translate source code for target code. In some embodiments, translation service application 180 may receive translation requests from translation logic 130 of compute node 105. The translation request may include a request to translate code, such as a particular function, portion of code, library, program, files, combinations thereof, and/or the like. The translation request may include information identifying the source code and/or information identifying characteristics of target code sought via the translation request.

In some embodiments, server node 150 may have access to target information 115, for instance, stored in memory 172 and/or a database 145 accessible to server node (for instance, via network 140 or a cloud). In general, target information 115 may form a target code database storing target code and/or target code information associated with the target code. Non-limiting examples of target code information may include the actual target code, a name or other identifier of the target code, version information, hardware and/or software information (for instance, hardware and/or software operating environment for executing target code), compatibility information (for instance, information indicating hardware and/or software that the target code is/is not compatible with), optimization characteristic (for example, characteristics that the target code is optimized for, such as power, efficiency, network communication, compression, decompression, cryptographic techniques, and/or the like), security information, and/or the like. In some embodiments, certain of the target code elements may be publicly available (for instance, without requiring security processes), while certain others of the target code elements may require secure access. For example, certain of the target code elements may only be provided in a non-human readable form (for instance, machine code, compiled code, assembly code, encrypted code, and/or the like) that may only be executed by a processing device and may not be read (or even reverse-engineered, decompiled, and/or the like).

In some embodiments, translation service application 180 may use source code information in the translation request to lookup potential target code in the target code database. Translation service application 180 may determine potential target code by matching (or determining one or more best matches for) the source code information (for instance, specifying a desired target code) with the target code information. Translation service application 180 may determine a target code element based on the source code information and may send the target code element to compute node 105 or, more specifically, to binary translation logic 135. In some embodiments, translation service application 180 may send the actual code for the target code element and/or information to allow compute node 105 to access the target code element.

Figure 2:
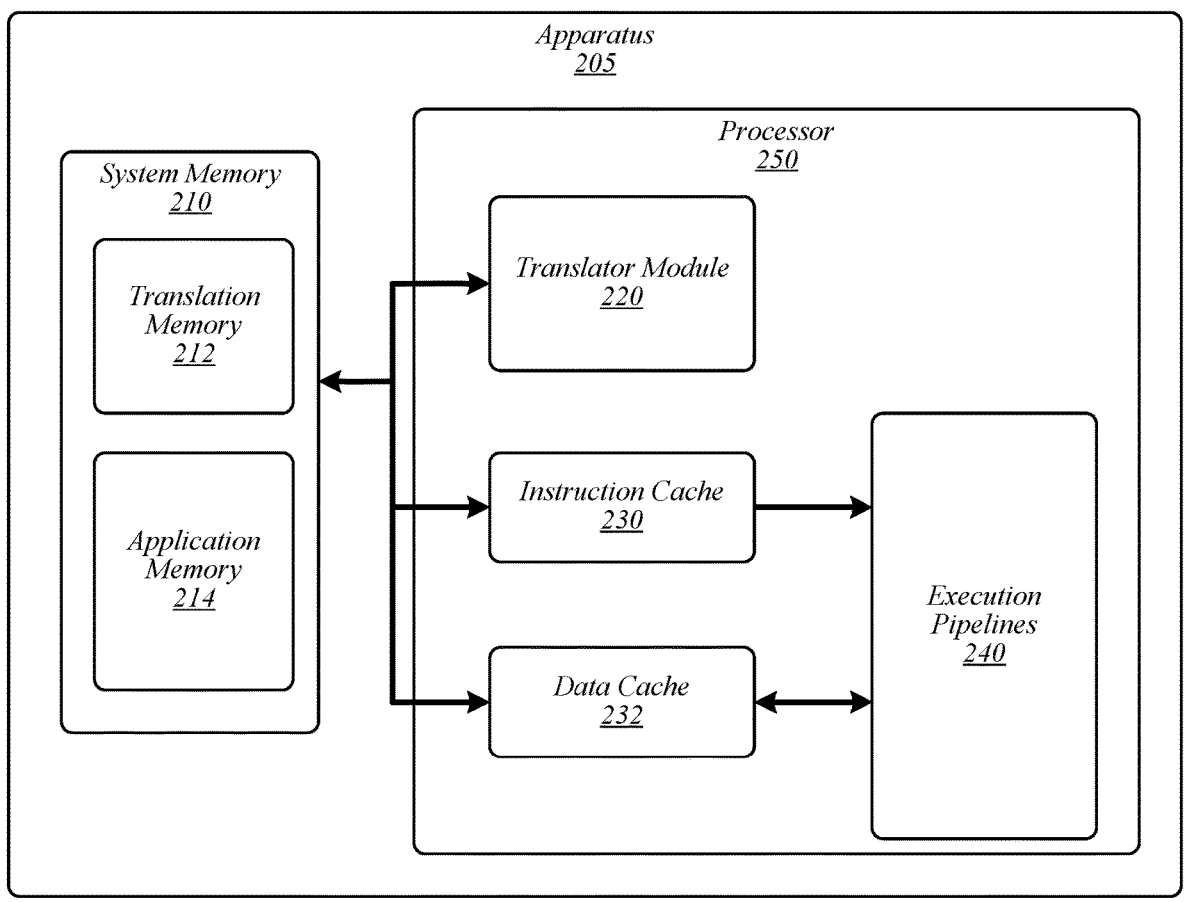
FIG. 2 illustrates an embodiment of a second operating environment.

FIG. 2 illustrates an example of an operating environment 200 that may be representative of some embodiments. As shown in FIG. 2, operating environment 200 may include an apparatus 205 having a system memory 210 and a translator module 220, an instruction cache 230 (or i-cache), a data cache, and/or execution pipelines 240 arranged in a processor 250. System memory 210 may include various memory portions, such as translation memory 212 and/or application memory 214. In some embodiments, translator memory 212 may be used to store, among other things, target code used to replace source code and application memory 214 may be used to host memory content for applications operated by apparatus 205.

In various embodiments, processor 205 may include a translator module 220, which may include a binary translation module or layer implemented in hardware, software, firmware, and/or any combination thereof. In some embodiments, translator module 220 may be capable of performing a translation process according to some embodiments and one or more conventional binary translation processes. For example, when code being executed by processor 250 reaches a function that has not been called before, the translator module 220 may operate to optimize the corresponding code. In various embodiments, translator module 220 may check the function at first invocation of the function and thereafter only in response to a change event, for example, that may require a new version of the function (or, more specifically, the corresponding target function) to be obtained. A non-limiting example of a change event may include a core migration).

In conventional binary translation processes, optimization may merely include low-level restructuring using a limited population of instructions, re-ordering sequence instructions, and/or replacing the source code with architecture-specific target code located in local memory, such as target code elements stored in translator memory 212. In some embodiments, translator module 220 may operate a translation process configured to initiate a connection (for example, a secure connection via one or more web-server application programming interfaces (APIs)) with a remote code database server storing target code elements (for instance, server node 150 and/or database 145).

In various embodiments, if translator module 220 cannot establish a connection with the remote code database server, translator module 220 may access local target code stored in translator memory 212 via a translation process according to some embodiments or proceed with conventional binary translation processes. Translator module 220 may transmit a translation request responsive to establishing a connection with the remote code database server. The translation request may include the code of the source code, a description of the microarchitecture that the target code will be run on, and/or optimization characteristics (for instance, whether the system is running with many threads and an efficient hyper-threading (HT) version is preferred, whether a single-threading (ST) version is preferred, whether the target code should be optimized for performance, efficiency, power, performance per power unit (performance/Watt), and/or the like), and/or the like.

Translator module 220 may receive the matching target code from the database service operating on the remote code database server, or 'NULL" or a null value if the remote code database server cannot find a match or an error occurred. In some embodiments, if translator module 220 receives a null value, translator module 220 may access local target code stored in translator memory 212 via a translation process according to some embodiments or proceed with conventional binary translation processes. In various embodiments, translator module 220 may receive target code from remote code database server. Processor 250 may execute the target code using the processor code path, such as using instruction cache 230, data cache 232, and/or execution pipelines 240.

Figure 3:
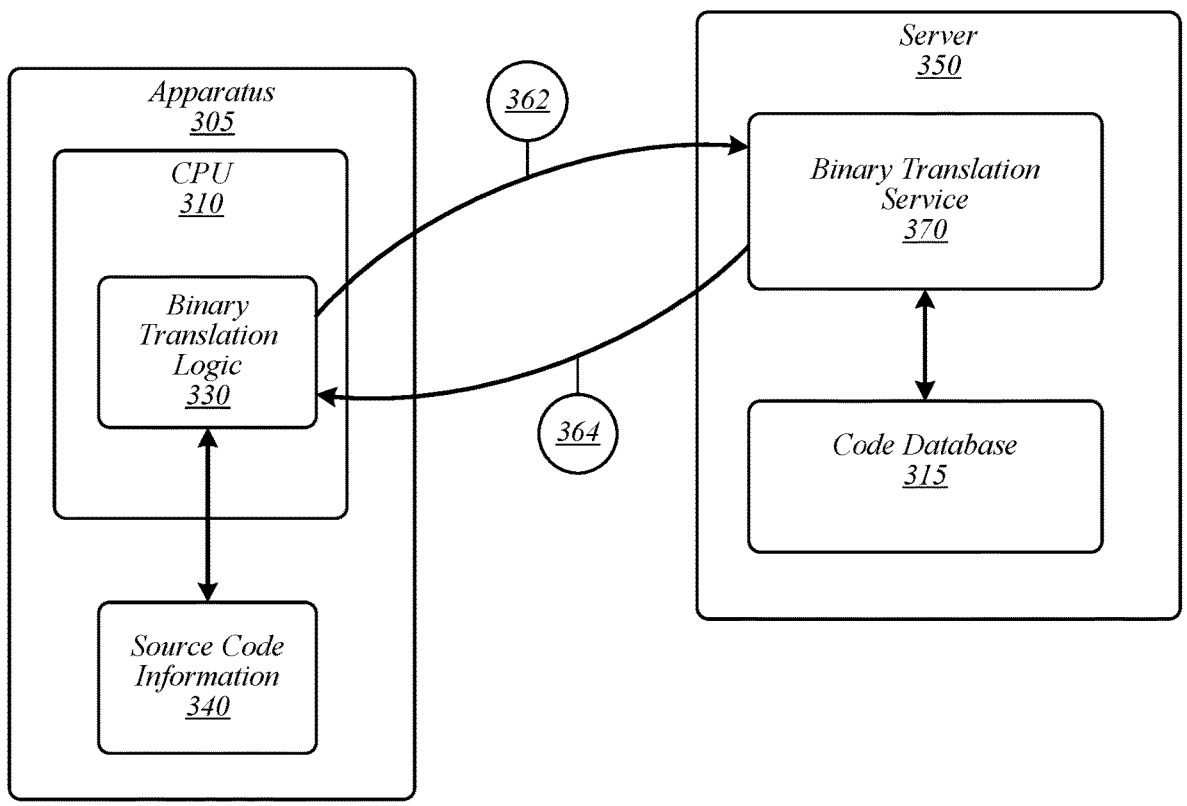
FIG. 3 illustrates an example of a third operating environment.

FIG. 3 illustrates an example of an operating environment 300 that may be representative of some embodiments. As shown in FIG. 3, operating environment 300 may include an apparatus 305 having a CPU 310 and source code information 340, for example, stored in a system memory (not shown) of apparatus 305. Apparatus 305 may be operably coupled with (or may establish an authenticated connection with) server 350 operating a binary translation service 370 and having a code database 315.

CPU 310 may execute a code element, such as a function. Prior to execution of the function, binary translation logic 330 may determine whether the function requires translation. For example, the function may include a translation indicator to communicate to CPU 310, binary translation logic 330, or another component of apparatus that the function requires translation. In some embodiments, binary translation logic 330 may check source code information 340 (or another database) to determine whether the function requires translation. For instance, source code information 340 may include a record for code elements and a translation indicator indicating whether the code element requires translation, has been translated, is associated with a change event requiring translation, and/or the like. In some embodiments, applications and/or portions thereof may be tagged or otherwise annotated in such a way that translation requests are initiated selectively for code elements having a high likelihood of being in code database 315.

In various embodiments, translation requests 362 may be initiated for certain designated applications, for instance, indicated as being critical or having multiple code-paths in code database 315. In some embodiments, code database 315 is not publicly available, for example, code database 315 may be a proprietary database only accessible to processors operating binary translation logic 330 according to some embodiments. In various embodiments, code database 315 may only be accessible via security or access information of source information included in translation request 362.

If source code information 340 indicates that the function requires translation, binary translation logic 330 may initiate a translation process according to some embodiments. In some embodiments, the translation process my include an initial authentication process in which apparatus 305 authenticates to server 350. In this manner, only authenticated devices may access target code of server 350. Binary translation logic 330 may transmit a translation request 362 to server 350 operating a binary translation service 370 according to some embodiments. Translation request 362 may include authentication information to allow apparatus 305 to access target code of server 350. In various embodiments, source information for binary translation service 370 to locate a match for the source code associated with translation request 362 (for example, for a Deflate compression process or a portion thereof).

In various embodiments, translation request 362 may include a fingerprint, hash digest, or other data structure or portion of code. In this manner, binary translation logic 330 may only send over a portion of the code associated with the function, for example, to save bandwidth or other resources. In some embodiments, binary translation logic 330 may subsequently decide to transmit the actual code, such as in response to a security clearance and/or an action taken by apparatus 305

Binary translation service 370 may include or may be communicatively coupled with code database 315. In some embodiments, code database 315 may maintain a set of target code elements, such as functions, having one or more versions. In some embodiments, code database 315 may include a plurality of records (or "rows"), where each row includes a function of a certain type (for instance, AES128, Deflate, and/or the like). In various embodiments, each row may include one or more version fields storing versions of the function for that row, such as publicly available code versions and/or optimized versions (for instance, optimized for a particular architecture and/or an optimization characteristic). For example, code database 315 may include a row or record for function AES128-CBC-Encrypt, which may include a plurality of variations of function AES128-CBC-Encrypt, such as a best version for a particular version of code (for instance, C), a best version for a particular type of code compiled with different compilers, public versions (for instance, OpenSSL, Linux, Crypto++, and/or the like), different assembly-coded versions (for instance, SSE, AVX ISA, blocked and unrolled for varying degrees of parallelism, versions compiled with different compilers, performance optimization for various processes (for instance, crypto functions, compression, decompression, integrity, error checking, networking, and/or the like), and/or the like. In some embodiments, code database 315 may include meta-data indicating the version of a target code element as well as optimization characteristics (for example, processes that the target code version is optimized for, such as performance, power, ST/HT, particular hardware, particular software, particular processor cores, particular operating system (OS), combinations thereof, and/or the like).

In various embodiments, binary translation service 370 may perform a target check responsive to authenticating with apparatus 305 and/or receiving translation request 362. Target check may determine whether there is a match in code databases 315 for translation request 362 based on the source code information of translation request. Binary translation service 370 may determine one or more matches (for instance, all matching functions, ranked matches, weighted matches, or matches otherwise organized based on source code information). In some embodiments, translation request 362 may include a fingerprint or some other portion or abbreviated form of the function code. In various embodiments, binary translation service 370 may be configured to determine matches based on the abbreviated code form, for example, code database 315 may include an abbreviated form of the code for each function or function version.

In some embodiments, binary translation service 370 may determine an optimal target code based on the source information, for instance, most closely matching the requirements and/or optimization characteristics of translation request 362. For example, binary translation service 370 may determine which record or row (a "target record") in code database 315 includes a function corresponding to the translation request (for example, a Deflate compression function or a portion thereof). Binary translation service 370 may proceed through the target record to determine the optimal target code version for the record. For example, binary translation service 370 may determine whether there is a version optimized for an optimization characteristic included in the source information.

In some embodiments, the optimization characteristics may be weighted and tallied to generate an optimization score. For example, source information may indicate a particular weight for each optimization score. In one example, source information may indicate an microarchitecture characteristic (a first optimization characteristic), a second optimization characteristic, and a third optimization characteristic. The microarchitecture optimization characteristic may be weighted highest (for instance, 10 points), the second optimization characteristic the second highest (for instance, 7 points), and the third optimization characteristic the third highest (for instance, 5 points). Accordingly, a function version optimized for the microarchitecture may be selected over versions optimized only for a single optimization characteristic; however, a version optimized for both the second optimization characteristic and the third optimization characteristic may be selected over a version optimized only for the microarchitecture. In some embodiments, ties may be evaluated based on various factors, for example, to select the version with the most optimization characteristics, versions optimized for the microarchitecture, and/or the like. Embodiments are not limited in this regard.

In some embodiments, binary translation service 370 may provide a translation response 364 to binary translation logic based on the results of the target check. In various embodiments, translation response 364 may return the code of the optimal target code to binary translation logic 330. CPU 310 may execute the code to perform the function associated with translation request 362 using the optimal available code.

Included herein is a set of logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 4:
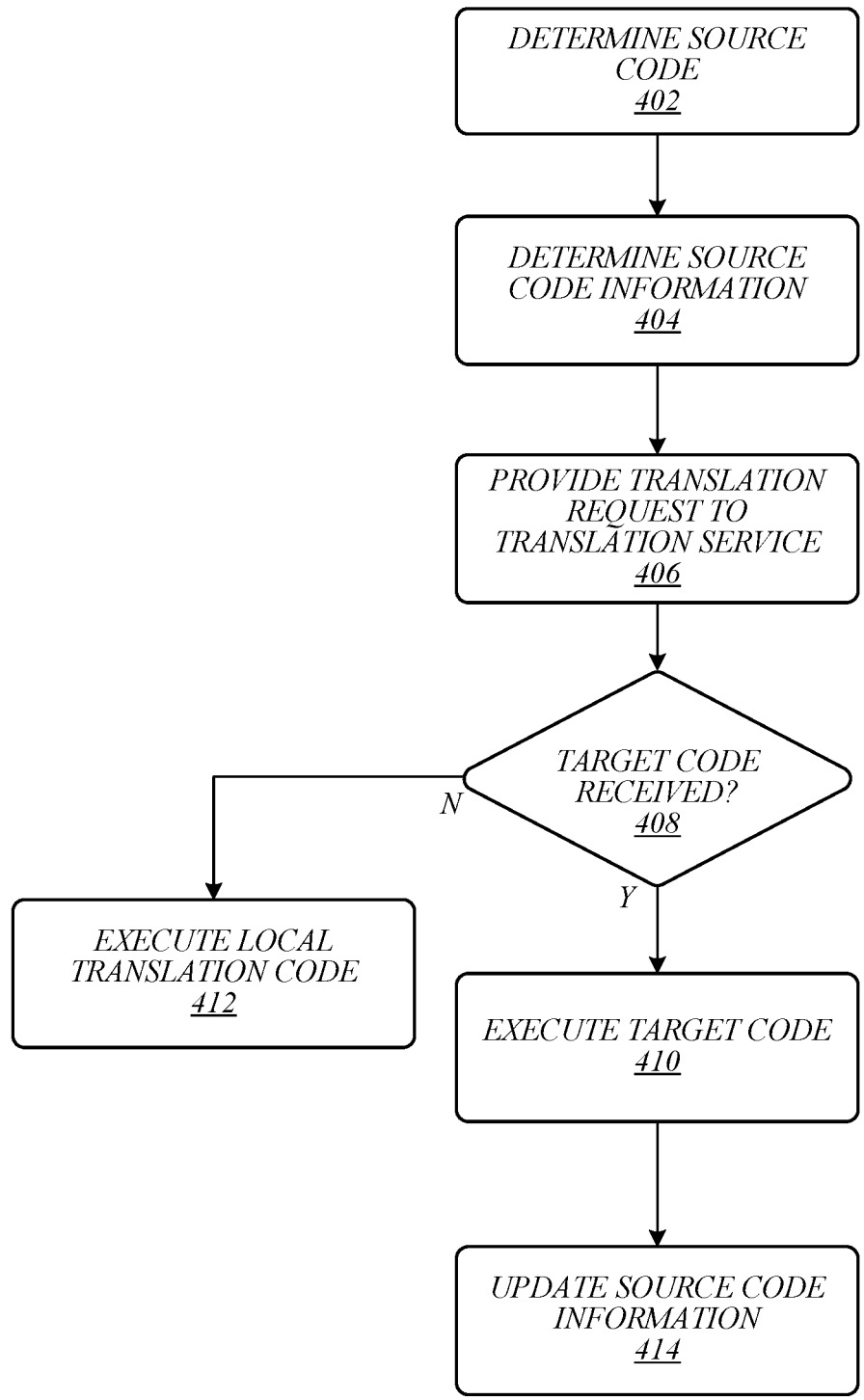
FIG. 4 illustrates an embodiment of a first logic flow.

FIG. 4 illustrates an embodiment of a logic flow 400. Logic flow 400 may be representative of some or all of the operations executed by one or more embodiments described herein, such as operations executed by one or more of compute node 105, server nodes 150 and/or 350, and/or apparatus 305. For example, logic flow 400 may generally include operations for a compute node to generate a translation request and receive target code in response to the translation request.

In the illustrated embodiment shown in FIG. 4, logic flow 400 may determine source code at block 402. For example, translation logic 130 may analyze, check, or otherwise process code being executed by processors 110a-n and determine whether a code element requires translation. For instance, all or substantially all functions may require translation during an initial invocation and/or a change event requiring translation, such as a firmware upgrade, core migration, and/or the like. The code requiring translation may operate as source code within a translation process configured according to some embodiments.

At block 404, logic flow 400 may determine source code information. For example, translation logic 130 may determine source code information associated with the source code for designating specific attributes of a translation request. In some embodiments, translation logic 130 may extract source code information from the code and/or associated application and/or access the source code information in a source code database 184. Logic flow 400 may transmit a translation request at block 406. For example, translation logic 130 may provide a translation request that includes source code information identifying the source code and/or any optimization characteristics, such as hardware attributes, characteristics to be optimized (for instance, power, efficiency, and/or the like), and/or the like. Translation logic 130 may provide the translation request to a translation service implemented by translation service application 180 of server node 150.

Logic flow 400 may determine whether target code has been received at block 406. For example, translation logic 130 may determine whether the translation service (for example, via server node 150) has transmitted target code to compute node 105 in response to the translation request. If logic flow 400 determines that the translation service has not transmitted target code to compute node 105, for example, following a timeout period, translation logic 130 may initiate a local binary translation process at block 412, such as using target code stored in local target code 182. In some embodiments, logic flow 400 may determine whether the failure to receive the target code is due to temporary conditions, such as a network failure, and/or the like. In such embodiments, logic flow 400 may flag the translation request to be retried, for instance, after a retry period (for example, as opposed to a conventional binary translation that doesn't need to replace the code more than once during a first call).

If logic flow determines that the translation service has transmitted target code to compute node 105, logic flow 400 may execute the target code at block 410. For example, translator module 220 may receive target code from remote code database server. Processor 250 may execute the target code using the processor code path, such as using instruction cache 230, data cache 232, and/or execution pipelines 240. At block 414, logic flow 400 may update source code. For example, translation logic 130 may update source code database 184 and/or 145 to indicate that source code has been translated. In some embodiments, translation service application 180 may or may also update target information 115 and/or 145 to indicate that the target code has been used in a translation operation.

Figure 5:
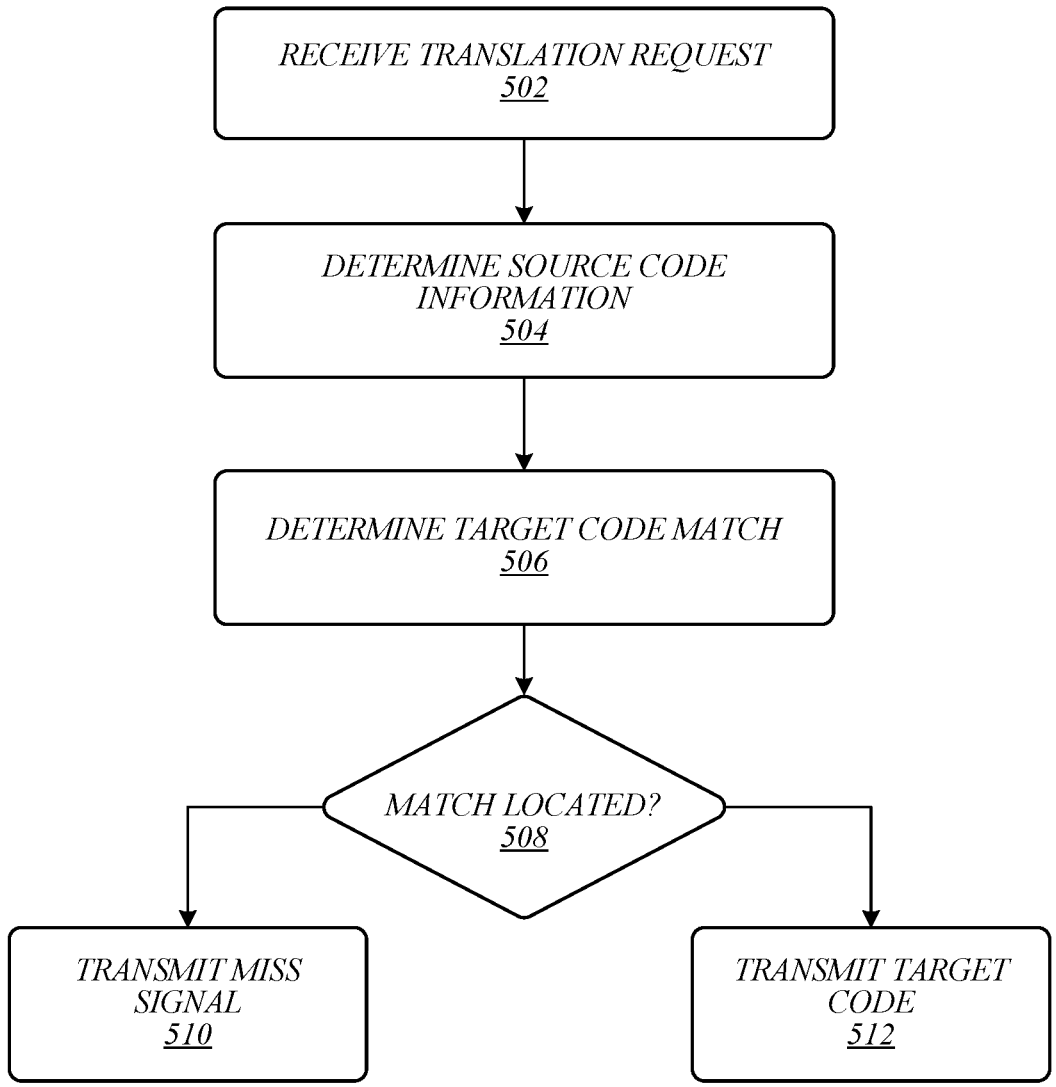
FIG. 5 illustrates an embodiment of a second logic flow.

FIG. 5 illustrates an embodiment of a logic flow 500. Logic flow 500 may be representative of some or all of the operations executed by one or more embodiments described herein, such as operations executed by one or more of compute node 105, server nodes 150 and/or 350, and/or apparatus 305. For example, logic flow 400 may generally include operations for a compute node to generate a translation request and receive target code in response to the translation request.

In the illustrated embodiment shown in FIG. 5, logic flow 500 may receive a translation request at block 502. For example, binary translation service 370 may receive translation request 362 from apparatus 305. At block 504, logic flow 500 may determine source code information. For example, binary translation service 370 may extract source code information from translation requests. The source code information may include code, programs, files, instructions, and/or the like of source code, operating conditions of apparatus 305 (for instance, hardware, software, and/or firmware), optimization characteristics, security credentials, and/or the like.

At block 506, logic flow 500 may determine a target code match. For example, binary translation service 370 may search code database 315 for one or more target code elements that match or otherwise correspond with source code of translation request 362. Logic flow 500 may transmit a miss signal at block 510 responsive to not determining a match at block 408. For example, binary translation service 370 may transmit a signal to apparatus 305 responsive to not finding a match for source code of code request 362. Logic flow 500 may transmit target code at block 512 responsive to determining a match at block 508. For example, binary translation service 370 may provide a translation response 364 to binary translation logic 330 based on the results of the target check. In various embodiments, translation response 364 may return the code of the optimal target code to binary translation logic 330. In various embodiments, translation response 364 may return a fingerprint, hash digest, or other data structure to binary translation logic 330 and subsequently decide to transmit the actual code, such as in response to a security clearance and/or an action taken by apparatus 305 (for example, generating or transmitting an indication that apparatus 305 is ready for the actual code).

Figure 6:
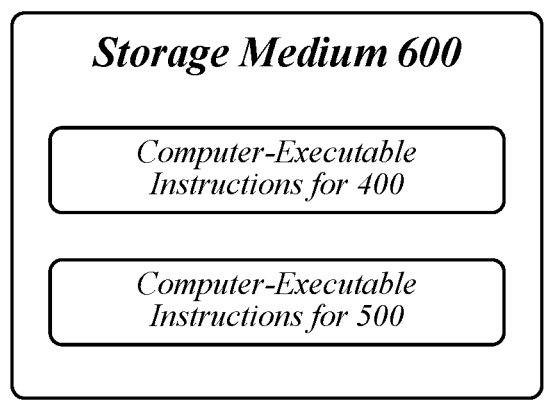
FIG. 6 illustrates an embodiment of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 400 and/or logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
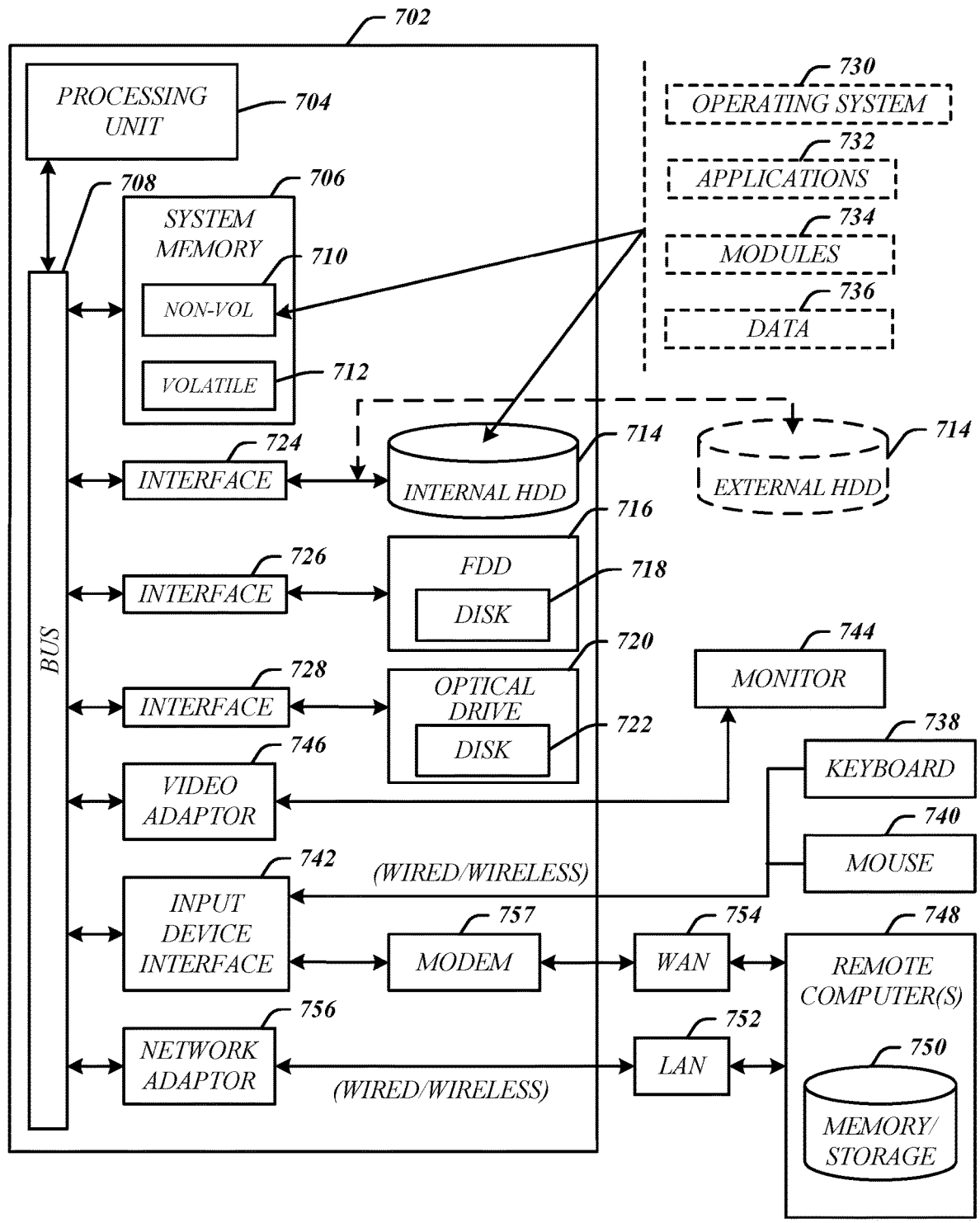
FIG. 7 illustrates an example computing platform.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may be representative, for example, of compute nodes 150, 405, 505, and/or 605 and server node 150. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of compute nodes 150, 405, 505, and/or 605 and server node 150.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1384 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include examples according to some embodiments:

Example 1 is an apparatus, comprising at least one memory, and logic, at least a portion of the logic comprised in hardware coupled to the at least one memory, the logic to determine a source code element to be translated to a target code element, determine source code information for the source code element, provide a translation request corresponding to the source code to a translation service, receive the target code element from the translation service, and execute the target code element in place of the source code element.

Example 2 is the apparatus of Example 1, the logic to store the source code information in the at least one memory.

Example 3 is the apparatus of Example 1, the source code information comprising a translation indicator to indicate whether the source code element is to be translated.

Example 4 is the apparatus of Example 1, the source code information to indicate whether the source code element is a new element or a previously-executed element.

Example 5 is the apparatus of Example 1, the logic to update the source code information for the source code element responsive to receiving the target code to indicate that the source code is a previously-executed element.

Example 6 is the apparatus of Example 1, the logic to determine that the source code element is to be translated to the target code element responsive to the source code element being a new element that has not previously been translated.

Example 7 is the apparatus of Example 1, the logic to determine that the source code element is not to be translated to the target code element responsive to the source code element being a previously-executed element that has previously been translated.

Example 8 is the apparatus of Example 1, the logic to determine a change event associated with a previously-executed element, and change a translate status of the previously-executed element to translate responsive to the change event.

Example 9 is the apparatus of Example 1, the source code element comprising a function of an application being executed by the apparatus.

Example 10 is the apparatus of Example 1, the source code information comprising an identifier of the source code element.

Example 11 is the apparatus of Example 1, the source code information comprising at least one optimization characteristic for the target code element.

Example 12 is the apparatus of Example 1, the source code information comprising at least one optimization characteristic for the target code element, the at least one optimization characteristic comprising at least one of power, efficiency, efficiency per power unit, single-threading (ST), hyperthreading (HT), particular hardware, or particular software.

Example 13 is the apparatus of Example 1, the source code information comprising at least one optimization characteristic for the target code element, the target code element comprising a code element optimized based on the at least one optimization characteristic.

Example 14 is the apparatus of Example 1, the source code information comprising a plurality of optimization characteristics, each of the plurality of optimization characteristics associated with a weight.

Example 15 is the apparatus of Example 1, the source code information comprising a plurality of optimization characteristics, each of the plurality of optimization characteristics associated with a weight, the target code element comprising a code element optimized based on the weight of each of the plurality of optimization characteristics.

Example 16 is the apparatus of Example 1, the logic to establish a connection with a server node, the server node having access to a code database storing code elements, and transmit the translation request to the server node responsive to establishing the connection.

Example 17 is the apparatus of Example 1, the logic to provide authentication information to a server node having access to a code database storing code elements, and transmit the translation request to the server node responsive to establishing an authenticated connection based on the authentication information.

Example 18 is the apparatus of Example 1, the target code element stored in a proprietary code database accessible via one of security information or connection information of the source code information.

Example 19 is the apparatus of Example 1, the source code information comprising an abbreviated form of the code of the source code element.

Example 20 is the apparatus of Example 1, the source code information comprising an abbreviated form of the source code element, the abbreviated form comprising a fingerprint of the code of the source code element.

Example 21 is the apparatus of Example 1, the target code element comprising non-human readable code.

Example 22 is the apparatus of Example 1, the logic to determine the target code element using local target code stored in the at least one memory responsive to a failure to receive the target code element.

Example 23 is a system, comprising the apparatus according to any of examples 1-22, and at least one transceiver.

Example 24 is a method, comprising determining a source code element to be translated to a target code element, determining source code information for the source code element, providing a translation request corresponding to the source code to a translation service, receiving the target code element from the translation service, and executing the target code element in place of the source code element.

Example 25 is the method of Example 24, comprising storing the source code information in at least one memory of a computing device executing the source code element.

Example 26 is the method of Example 24, the source code information comprising a translation indicator to indicate whether the source code element is to be translated.

Example 27 is the method of Example 24, the source code information to indicate whether the source code element is a new element or a previously-executed element.

Example 28 is the method of Example 24, comprising updating the source code information for the source code element responsive to receiving the target code to indicate that the source code is a previously-executed element.

Example 29 is the method of Example 24, comprising determining that the source code element is to be translated to the target code element responsive to the source code element being a new element that has not previously been translated.

Example 30 is the method of Example 24, comprising determining that the source code element is not to be translated to the target code element responsive to the source code element being a previously-executed element that has previously been translated.

Example 31 is the method of Example 24, comprising determining a change event associated with a previously-executed element, changing a translate status of the previously-executed element to translate responsive to the change event.

Example 32 is the method of Example 24, the source code element comprising a function of an application being executed by a computing device.

Example 33 is the method of Example 24, the source code information comprising an identifier of the source code element.

Example 34 is the method of Example 24, the source code information comprising at least one optimization characteristic for the target code element.

Example 35 is the method of Example 24, the source code information comprising at least one optimization characteristic for the target code element, the at least one optimization characteristic comprising at least one of power, efficiency, efficiency per power unit, single-threading (ST), hyper-threading (HT), particular hardware, or particular software.

Example 36 is the method of Example 24, the source code information comprising at least one optimization characteristic for the target code element, the target code element comprising a code element optimized based on the at least one optimization characteristic.

Example 37 is the method of Example 24, the source code information comprising a plurality of optimization characteristics, each of the plurality of optimization characteristics associated with a weight.

Example 38 is the method of Example 24, the source code information comprising a plurality of optimization characteristics, each of the plurality of optimization characteristics associated with a weight, the target code element comprising a code element optimized based on the weight of each of the plurality of optimization characteristics.

Example 39 is the method of Example 24, comprising establishing a connection with a server node, the server node having access to a code database storing code elements, and transmitting the translation request to the server node responsive to establishing the connection.

Example 40 is the method of Example 24, comprising providing authentication information to a server node having access to a code database storing code elements, transmitting the translation request to the server node responsive to establishing an authenticated connection based on the authentication information.

Example 41 is the method of Example 24, the target code element stored in a proprietary code database accessible via one of security information or connection information of the source code information.

Example 42 is the method of Example 24, the source code information comprising an abbreviated form of the code of the source code element.

Example 43 is the method of Example 24, the source code information comprising an abbreviated form of the source code element, the abbreviated form comprising a fingerprint of the code of the source code element.

Example 44 is the method of Example 24, the target code element comprising non-human readable code.

Example 45 is the method of Example 24, comprising determining the target code element using local target code stored in at least one memory of a computing device executing the source code element responsive to a failure to receive the target code element.

Example 46 is a computer-readable storage medium that stores instructions for execution by processing circuitry of a computing device, the instructions to cause the computing device to determine a source code element to be translated to a target code element, determine source code information for the source code element, provide a translation request corresponding to the source code to a translation service, receive the target code element from the translation service, and execute the target code element in place of the source code element.

Example 47 is the computer-readable storage medium of Example 46, the instructions to cause the computing device to store the source code information in at least one memory of the computing device.

Example 48 is the computer-readable storage medium of Example 46, the source code information comprising a translation indicator to indicate whether the source code element is to be translated.

Example 49 is the computer-readable storage medium of Example 46, the source code information to indicate whether the source code element is a new element or a previously-executed element.

Example 50 is the computer-readable storage medium of Example 46, the instructions to cause the computing device to update the source code information for the source code element responsive to receiving the target code to indicate that the source code is a previously-executed element.

Example 51 is the computer-readable storage medium of Example 46, the instructions to cause the computing device to determine that the source code element is to be translated to the target code element responsive to the source code element being a new element that has not previously been translated.

Example 52 is the computer-readable storage medium of Example 46, the instructions to cause the computing device to determine that the source code element is not to be translated to the target code element responsive to the source code element being a previously-executed element that has previously been translated.

Example 53 is the computer-readable storage medium of Example 46, the instructions to cause the computing device to determine a change event associated with a previously-executed element, change a translate status of the previously-executed element to translate responsive to the change event.

Example 54 is the computer-readable storage medium of Example 46, the source code element comprising a function of an application being executed by the computing device.

Example 55 is the computer-readable storage medium of Example 46, the source code information comprising an identifier of the source code element.

Example 56 is the computer-readable storage medium of Example 46, the source code information comprising at least one optimization characteristic for the target code element.

Example 57 is the computer-readable storage medium of Example 46, the source code information comprising at least one optimization characteristic for the target code element, the at least one optimization characteristic comprising at least one of power, efficiency, efficiency per power unit, single-threading (ST), hyperthreading (HT), particular hardware, or particular software.

Example 58 is the computer-readable storage medium of Example 46, the source code information comprising at least one optimization characteristic for the target code element, the target code element comprising a code element optimized based on the at least one optimization characteristic.

Example 59 is the computer-readable storage medium of Example 46, the source code information comprising a plurality of optimization characteristics, each of the plurality of optimization characteristics associated with a weight.

Example 60 is the computer-readable storage medium of Example 46, the source code information comprising a plurality of optimization characteristics, each of the plurality of optimization characteristics associated with a weight, the target code element comprising a code element optimized based on the weight of each of the plurality of optimization characteristics.

Example 61 is the computer-readable storage medium of Example 46, the instructions to cause the computing device to establish a connection with a server node, the server node having access to a code database storing code elements, and transmit the translation request to the server node responsive to establishing the connection.

Example 62 is the computer-readable storage medium of Example 46, the instructions to cause the computing device to provide authentication information to a server node having access to a code database storing code elements, transmit the translation request to the server node responsive to establishing an authenticated connection based on the authentication information.

Example 63 is the computer-readable storage medium of Example 46, the target code element stored in a proprietary code database accessible via one of security information or connection information of the source code information.

Example 64 is the computer-readable storage medium of Example 46, the source code information comprising an abbreviated form of the code of the source code element.

Example 65 is the computer-readable storage medium of Example 46, the source code information comprising an abbreviated form of the source code element, the abbreviated form comprising a fingerprint of the code of the source code element.

Example 66 is the computer-readable storage medium of Example 46, the target code element comprising non-human readable code.

Example 67 is the computer-readable storage medium of Example 46, the instructions to cause the computing device to determine the target code element using local target code stored in at least one memory of the computing device responsive to a failure to receive the target code element.

Example 68 is an apparatus, comprising a source code management means to determine a source code element to be translated to a target code element, and determine source code information for the source code element, a request means to provide a translation request corresponding to the source code to a translation service, and a target code means to receive the target code element from the translation service, and execute the target code element in place of the source code element.

Example 69 is the apparatus of Example 68, the source code management means to store the source code information in the at least one memory.

Example 70 is the apparatus of Example 68, the source code information comprising a translation indicator to indicate whether the source code element is to be translated.

Example 71 is the apparatus of Example 68, the source code information to indicate whether the source code element is a new element or a previously-executed element.

Example 72 is the apparatus of Example 68, the source code management means to update the source code information for the source code element responsive to receiving the target code to indicate that the source code is a previously-executed element.

Example 73 is the apparatus of Example 68, the source code management means to determine that the source code element is to be translated to the target code element responsive to the source code element being a new element that has not previously been translated.

Example 74 is the apparatus of Example 68, the source code management means to determine that the source code element is not to be translated to the target code element responsive to the source code element being a previously-executed element that has previously been translated.

Example 75 is the apparatus of Example 68, the source code management means to determine a change event associated with a previously-executed element, and change a translate status of the previously-executed element to translate responsive to the change event.

Example 76 is the apparatus of Example 68, the source code element comprising a function of an application being executed by the apparatus.

Example 77 is the apparatus of Example 68, the source code information comprising an identifier of the source code element.

Example 78 is the apparatus of Example 68, the source code information comprising at least one optimization characteristic for the target code element.

Example 79 is the apparatus of Example 68, the source code information comprising at least one optimization characteristic for the target code element, the at least one optimization characteristic comprising at least one of power, efficiency, efficiency per power unit, single-threading (ST), hyperthreading (HT), particular hardware, or particular software.

Example 80 is the apparatus of Example 68, the source code information comprising at least one optimization characteristic for the target code element, the target code element comprising a code element optimized based on the at least one optimization characteristic.

Example 81 is the apparatus of Example 68, the source code information comprising a plurality of optimization characteristics, each of the plurality of optimization characteristics associated with a weight.

Example 82 is the apparatus of Example 68, the source code information comprising a plurality of optimization characteristics, each of the plurality of optimization characteristics associated with a weight, the target code element comprising a code element optimized based on the weight of each of the plurality of optimization characteristics.

Example 83 is the apparatus of Example 68, comprising an authentication means to establish a connection with a server node, the server node having access to a code database storing code elements, the request means to transmit the translation request to the server node responsive to establishing the connection.

Example 84 is the apparatus of Example 68, comprising an authentication means to provide authentication information to a server node having access to a code database storing code elements and to to establish an authenticated connection based on the authentication information, the request means to transmit the translation request to the server node responsive to establishment of the authenticated connection.

Example 85 is the apparatus of Example 68, the target code element stored in a proprietary code database accessible via one of security information or connection information of the source code information.

Example 86 is the apparatus of Example 68, the source code information comprising an abbreviated form of the code of the source code element.

Example 87 is the apparatus of Example 68, the source code information comprising an abbreviated form of the source code element, the abbreviated form comprising a fingerprint of the code of the source code element.

Example 88 is the apparatus of Example 68, the target code element comprising non-human readable code.

Example 89 is the apparatus of Example 68, the target code means to determine the target code element using local target code stored in the at least one memory responsive to a failure to receive the target code element.

Example 90 is a system, comprising the apparatus according to any of examples 63-89, and at least one transceiver.

Example 91 is an apparatus, comprising at least one memory, and logic, at least a portion of the logic comprised in hardware coupled to the at least one memory, the logic to provide a translation service operative to receive a translation request from a compute node, the translation request comprising source code information, access a code database comprising target code, and determine at least one target code element from the target code corresponding to the source code information.

Example 92 is the apparatus of Example 91, the logic to provide the at least one target code element to the compute node.

Example 93 is the apparatus of Example 91, the source code element comprising a function of an application being executed by the compute node.

Example 94 is the apparatus of Example 91, the source code information comprising an identifier of the source code element.

Example 95 is the apparatus of Example 91, the source code information comprising at least a portion of code of the source code element.

Example 96 is the apparatus of Example 91, the source code information comprising at least one optimization characteristic for the at least one target code element.

Example 97 is the apparatus of Example 91, the source code information comprising at least one optimization characteristic for the at least one target code element, the at least one optimization characteristic comprising at least one of power, efficiency, efficiency per power unit, single-threading (ST), hyperthreading (HT), particular hardware, or particular software.

Example 98 is the apparatus of Example 91, the source code information comprising at least one optimization characteristic for the at least one target code element, the target code element comprising a code element optimized based on the at least one optimization characteristic.

Example 99 is the apparatus of Example 91, the source code information comprising a plurality of optimization characteristics, each of the plurality of optimization characteristics associated with a weight.

Example 100 is the apparatus of Example 91, the source code information comprising a plurality of optimization characteristics, each of the plurality of optimization characteristics associated with a weight, the target code element comprising a code element optimized based on the weight of each of the plurality of optimization characteristics.

Example 101 is the apparatus of Example 91, the logic to establish a connection with the compute node, and provide the translation service responsive to establishing the connection.

Example 102 is the apparatus of Example 91, the logic to receive authentication information from the compute node, and provide the translation service responsive to establishing an authenticated connection based on the authentication information.

Example 103 is the apparatus of Example 91, the code database comprising a proprietary code database accessible via one of security information or connection information of the source code information.

Example 104 is the apparatus of Example 91, the code database comprising a plurality of records, each of the plurality of records corresponding to a function and comprising at least one version of the function.

Example 105 is the apparatus of Example 91, the code database comprising a plurality of records, each of the plurality of records corresponding to a function and comprising at least one version field, the at least one version field comprising an optimized function optimized based on at least one optimization characteristic.

Example 106 is the apparatus of Example 91, the code database comprising at least one record corresponding to a function, the at least one record comprising a field storing an abbreviated form of code of the function.

Example 107 is the apparatus of Example 91, the code database comprising at least one record corresponding to a function, the at least one record comprising a field storing fingerprint of code of the function.

Example 108 is the apparatus of Example 91, the at least one target code element comprising non-human readable code.

Example 109 is a method, comprising receiving, at a service node providing a translation service, a translation request from a compute node, the translation request comprising source code information, accessing a code database comprising target code, and determining at least one target code element from the target code corresponding to the source code information.

Example 110 is the method of Example 91, comprising providing the at least one target code element to the compute node.

Example 111 is the method of Example 91, the source code element comprising a function of an application being executed by the compute node.

Example 112 is the method of Example 91, the source code information comprising an identifier of the source code element.

Example 113 is the method of Example 91, the source code information comprising at least a portion of code of the source code element.

Example 114 is the method of Example 91, the source code information comprising at least one optimization characteristic for the at least one target code element.

Example 115 is the method of Example 91, the source code information comprising at least one optimization characteristic for the at least one target code element, the at least one optimization characteristic comprising at least one of power, efficiency, efficiency per power unit, single-threading (ST), hyperthreading (HT), particular hardware, or particular software.

Example 116 is the method of Example 91, the source code information comprising at least one optimization characteristic for the at least one target code element, the target code element comprising a code element optimized based on the at least one optimization characteristic.

Example 117 is the method of Example 91, the source code information comprising a plurality of optimization characteristics, each of the plurality of optimization characteristics associated with a weight.

Example 118 is the method of Example 91, the source code information comprising a plurality of optimization characteristics, each of the plurality of optimization characteristics associated with a weight, the target code element comprising a code element optimized based on the weight of each of the plurality of optimization characteristics.

Example 119 is the method of Example 91, comprising establishing a connection with the compute node, and providing the translation service responsive to establishing the connection.

Example 120 is the method of Example 91, comprising receiving authentication information from the compute node, providing the translation service responsive to establishing an authenticated connection based on the authentication information.

Example 121 is the method of Example 91, the code database comprising a proprietary code database accessible via one of security information or connection information of the source code information.

Example 122 is the method of Example 91, the code database comprising a plurality of records, each of the plurality of records corresponding to a function and comprising at least one version of the function.

Example 123 is the method of Example 91, the code database comprising a plurality of records, each of the plurality of records corresponding to a function and comprising at least one version field, the at least one version field comprising an optimized function optimized based on at least one optimization characteristic.

Example 124 is the method of Example 91, the code database comprising at least one record corresponding to a function, the at least one record comprising a field storing an abbreviated form of code of the function.

Example 125 is the method of Example 91, the code database comprising at least one record corresponding to a function, the at least one record comprising a field storing fingerprint of code of the function.

Example 126 is the method of Example 91, the at least one target code element comprising non-human readable code.

Example 127 is a computer-readable storage medium that stores instructions for execution by processing circuitry of a computing device, the instructions to cause the computing device to provide a translation service operable to receive a translation request from a compute node, the translation request comprising source code information, access a code database comprising target code, and determine at least one target code element from the target code corresponding to the source code information.

Example 128 is the computer-readable storage medium of Example 127, the instructions to cause the computing device to provide the at least one target code element to the compute node.

Example 129 is the computer-readable storage medium of Example 127, the source code element comprising a function of an application being executed by the compute node.

Example 130 is the computer-readable storage medium of Example 127, the source code information comprising an identifier of the source code element.

Example 131 is the computer-readable storage medium of Example 127, the source code information comprising at least a portion of code of the source code element.

Example 132 is the computer-readable storage medium of Example 127, the source code information comprising at least one optimization characteristic for the at least one target code element.

Example 133 is the computer-readable storage medium of Example 127, the source code information comprising at least one optimization characteristic for the at least one target code element, the at least one optimization characteristic comprising at least one of power, efficiency, efficiency per power unit, single-threading (ST), hyperthreading (HT), particular hardware, or particular software.

Example 134 is the computer-readable storage medium of Example 127, the source code information comprising at least one optimization characteristic for the at least one target code element, the target code element comprising a code element optimized based on the at least one optimization characteristic.

Example 135 is the computer-readable storage medium of Example 127, the source code information comprising a plurality of optimization characteristics, each of the plurality of optimization characteristics associated with a weight.

Example 136 is the computer-readable storage medium of Example 127, the source code information comprising a plurality of optimization characteristics, each of the plurality of optimization characteristics associated with a weight, the target code element comprising a code element optimized based on the weight of each of the plurality of optimization characteristics.

Example 137 is the computer-readable storage medium of Example 127, the instructions to cause the computing device to establish a connection with the compute node, and provide the translation service responsive to establishing the connection.

Example 138 is the computer-readable storage medium of Example 127, the instructions to cause the computing device to receive authentication information from the compute node, provide the translation service responsive to establishing an authenticated connection based on the authentication information.

Example 139 is the computer-readable storage medium of Example 127, the code database comprising a proprietary code database accessible via one of security information or connection information of the source code information.

Example 140 is the computer-readable storage medium of Example 127, the code database comprising a plurality of records, each of the plurality of records corresponding to a function and comprising at least one version of the function.

Example 141 is the computer-readable storage medium of Example 127, the code database comprising a plurality of records, each of the plurality of records corresponding to a function and comprising at least one version field, the at least one version field comprising an optimized function optimized based on at least one optimization characteristic.

Example 142 is the computer-readable storage medium of Example 127, the code database comprising at least one record corresponding to a function, the at least one record comprising a field storing an abbreviated form of code of the function.

Example 143 is the computer-readable storage medium of Example 127, the code database comprising at least one record corresponding to a function, the at least one record comprising a field storing fingerprint of code of the function.

Example 144 is the computer-readable storage medium of Example 127, the at least one target code element comprising non-human readable code.

Example 145 is an apparatus, comprising a request manager means to receive a translation request from a compute node, the translation request comprising source code information, and a translation means to access a code database comprising target code, and determine at least one target code element from the target code corresponding to the source code information.

Example 146 is the apparatus of Example 144, the translation means to provide the at least one target code element to the compute node.

Example 147 is the apparatus of Example 144, the source code element comprising a function of an application being executed by the compute node.

Example 148 is the apparatus of Example 144, the source code information comprising an identifier of the source code element.

Example 149 is the apparatus of Example 144, the source code information comprising at least a portion of code of the source code element.

Example 150 is the apparatus of Example 144, the source code information comprising at least one optimization characteristic for the at least one target code element.

Example 151 is the apparatus of Example 144, the source code information comprising at least one optimization characteristic for the at least one target code element, the at least one optimization characteristic comprising at least one of power, efficiency, efficiency per power unit, single-threading (ST), hyperthreading (HT), particular hardware, or particular software.

Example 152 is the apparatus of Example 144, the source code information comprising at least one optimization characteristic for the at least one target code element, the target code element comprising a code element optimized based on the at least one optimization characteristic.

Example 153 is the apparatus of Example 144, the source code information comprising a plurality of optimization characteristics, each of the plurality of optimization characteristics associated with a weight.

Example 154 is the apparatus of Example 144, the source code information comprising a plurality of optimization characteristics, each of the plurality of optimization characteristics associated with a weight, the target code element comprising a code element optimized based on the weight of each of the plurality of optimization characteristics.

Example 155 is the apparatus of Example 144, comprising an authentication means to establish a connection with the compute node, the translation means to provide the translation service responsive to establishment of the connection.

Example 156 is the apparatus of Example 144, comprising an authentication means to receive authentication information from the compute node and to establish an authenticated connection based on the authentication information, the translation means to provide the translation service responsive to establishment of the authenticated connection.

Example 157 is the apparatus of Example 144, the code database comprising a proprietary code database accessible via one of security information or connection information of the source code information.

Example 158 is the apparatus of Example 144, the code database comprising a plurality of records, each of the plurality of records corresponding to a function and comprising at least one version of the function.

Example 159 is the apparatus of Example 144, the code database comprising a plurality of records, each of the plurality of records corresponding to a function and comprising at least one version field, the at least one version field comprising an optimized function optimized based on at least one optimization characteristic.

Example 160 is the apparatus of Example 144, the code database comprising at least one record corresponding to a function, the at least one record comprising a field storing an abbreviated form of code of the function.

Example 161 is the apparatus of Example 144, the code database comprising at least one record corresponding to a function, the at least one record comprising a field storing fingerprint of code of the function.

Example 162 is the apparatus of Example 144, the at least one target code element comprising non-human readable code.

Example 163 is a system, comprising the apparatus according to any of examples 144-161, and at least one transceiver.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.112(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of the logic comprised in hardware coupled to the at least one memory, the logic to:
      determine a source code element to be translated to a target code element,
      determine source code information for the source code element,
      provide a translation request corresponding to the source code to a translation service,
      receive the target code element from the translation service,
      execute the target code element in place of the source code element,
      determine a change event associated with a previously executed source code element, and
      change a translate status of the previously executed source code element to translate responsive to the change event.

2. The apparatus of claim 1, the source code information comprising a translation indicator to indicate whether the source code element is to be translated.

3. The apparatus of claim 1, the logic to update the source code information for the source code element responsive to receiving the target code to indicate that the source code is a previously-executed element.

4. The apparatus of claim 1, the source code element comprising a function of an application being executed by the apparatus.

5. The apparatus of claim 1, the source code information comprising an identifier of the source code element.

6. The apparatus of claim 1, the source code information comprising at least one optimization characteristic for the target code element.

7. The apparatus of claim 1, the source code information comprising at least one optimization characteristic for the target code element, the at least one optimization characteristic comprising at least one of power, efficiency, efficiency per power unit, single-threading (ST), hyperthreading (HT), particular hardware, or particular software.

8. The apparatus of claim 1, the source code information comprising at least one optimization characteristic for the target code element, the target code element comprising a code element optimized based on the at least one optimization characteristic.

9. The apparatus of claim 1, the source code information comprising a plurality of optimization characteristics, each of the plurality of optimization characteristics associated with a weight, the target code element comprising a code element optimized based on the weight of each of the plurality of optimization characteristics.

10. The apparatus of claim 1, the logic to:
provide authentication information to a server node having access to a code database storing code elements, and
transmit the translation request to the server node responsive to establishing an authenticated connection based on the authentication information.

11. The apparatus of claim 1, the target code element stored in a proprietary code database accessible via one of security information or connection information of the source code information.

12. The apparatus of claim 1, the source code information comprising an abbreviated form of the source code element.

13. The apparatus of claim 1, the logic to determine the target code element using local target code stored in the at least one memory responsive to a failure to receive the target code element.

14. A method, comprising:
determining a source code element to be translated to a target code element;
determining source code information for the source code element;
providing a translation request corresponding to the source code to a translation service;
receiving the target code element from the translation service;
executing the target code element in place of the source code element;
determining a change event associated with a previously executed source code element; and
changing a translate status of the previously executed source code element to translate responsive to the change event.

15. The method of claim 14, the source code information comprising a translation indicator to indicate whether the source code element is to be translated.

16. The method of claim 14, the source code element comprising a function of an application being executed by a computing device.

17. The method of claim 14, the source code information comprising at least one optimization characteristic for the target code element, the at least one optimization characteristic comprising at least one of power, efficiency, efficiency per power unit, single-threading (ST), hyperthreading (HT), particular hardware, or particular software.

18. The method of claim 14, the source code information comprising at least one optimization characteristic for the target code element, the target code element comprising a code element optimized based on the at least one optimization characteristic.

19. The method of claim 14, comprising:
providing authentication information to a server node having access to a code database storing code elements; and
transmitting the translation request to the server node responsive to establishing an authenticated connection based on the authentication information.

20. An apparatus, comprising:
at least one memory; and
logic, at least a portion of the logic comprised in hardware coupled to the at least one memory, the logic to provide a translation service operative to:
receive a translation request from a compute node, the translation request comprising source code information,
access a code database comprising target code,
determine at least one target code element from the target code corresponding to the source code information,
determine a change event associated with a previously executed source code element, and
change, in the code database, a translate status of the previously executed source code element to translate responsive to the change event.

21. The apparatus of claim 20, the source code information comprising at least one optimization characteristic for the at least one target code element, the target code element comprising a code element optimized based on the at least one optimization characteristic.

22. The apparatus of claim 20, the logic to:
receive authentication information from the compute node, and
provide the translation service responsive to establishing an authenticated connection based on the authentication information.

23. The apparatus of claim 20, the code database comprising a proprietary code database accessible via one of security information or connection information of the source code information.

24. The apparatus of claim 20, the code database comprising a plurality of records, each of the plurality of records corresponding to a function and comprising at least one version field, the at least one version field comprising an optimized function optimized based on at least one optimization characteristic.

* * * * *